United States Patent Office

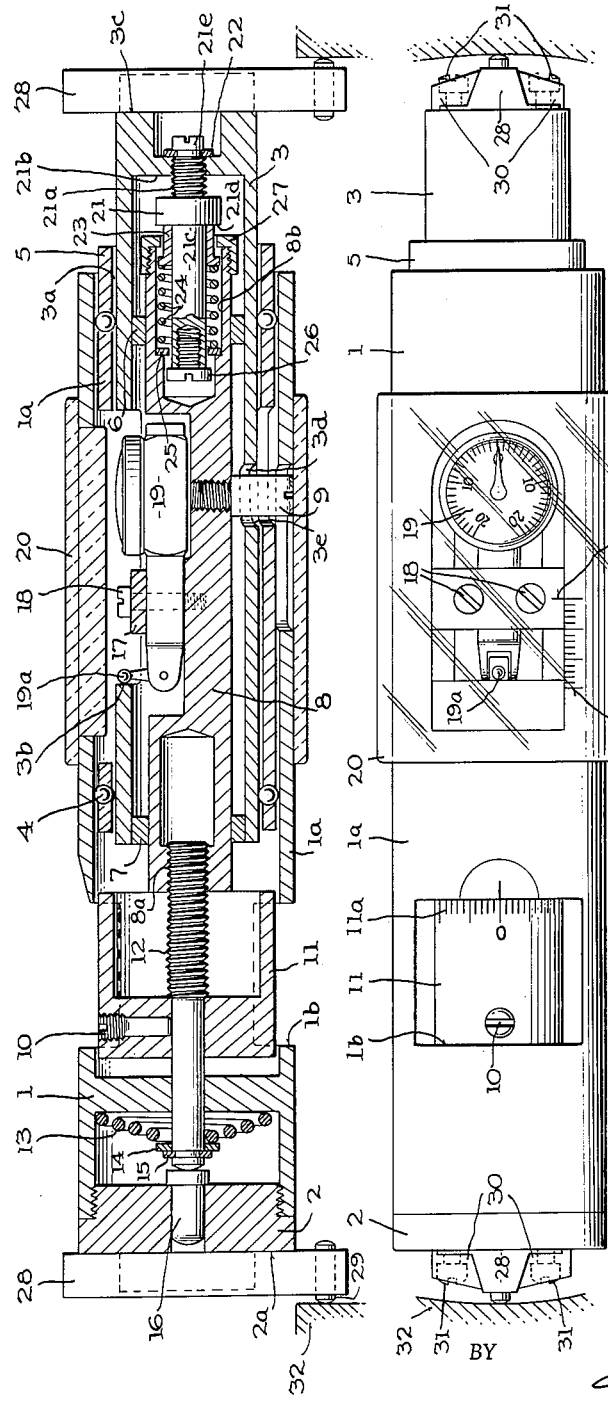

3,032,883
Patented May 8, 1962

3,032,883
LENGTH MEASURING APPLIANCES
Hans Meyer, Le Bugnon 24, Renens, Vaud, Switzerland
Filed Oct. 17, 1960, Ser. No. 62,918
Claims priority, application Switzerland Nov. 30, 1959
3 Claims. (Cl. 33—164)

Length measuring apparatus have become known which, sliding in a body with a fixed measuring stop, are provided with a movable core, which at its outer end is provided with a measuring gauge, which, with its key bolt forms the movable measuring stop. In this connection the core is mostly connected to the body by a micrometer screw. In the known manner the measuring takes place by means of the micrometer screw the core of the appliance located in the measuring position is displaced until the measuring gauge reaches its zero position. The measuring result can then be read from drum graduation of the micrometer.

According to their construction the appliances of the type described are suitable for simple internal measurements in which the measuring axis coincides with the instrument axis. When, however, the measuring axis is at a predetermined distance from the instrument axis, as is the case with many internal measurements, difficulties occur. In such a case it is necessary to use shortened measuring impacts. The latter must therefore be applied to the body without difficulty, but not on the measuring gauge, on which every eccentric engagement of the measurement force produces variations and measuring inaccuracies. It is therefore necessary, in different cases for internal measurements to provide expensive additional means. This applies to a considerable extent in the case of external measurements. For this purpose, appliances of the type described are only suitable after providing them with complicated devices, such as, for example diverting levers and so forth.

The present invention has for its object to eliminate the disadvantages referred to. It relates to a length measuring appliance consisting of a body and a measuring stop secured thereto, a core connected to the body by a micrometer screw and opposite an adjustable core, characterised by a slide mounted for axial movement in the body which carries the second measuring stop, and which is limited in its movement relatively to the core, and a measuring appliance, which indicates the relative movement of the core to the slide.

The advantages of the length measuring appliance according to the invention resides in the fact that, after simple actuation of a moving member, it can be used equally well for internal and external measurements, whilst the measuring accuracy is also retained when the measuring axis is located at a predetermined distance from the instrument axis.

The accompanying drawings show, by way of example, a form of construction of the appliance according to the present invention, wherein:

FIG. 1 is a longitudinal section through the appliance.
FIG. 2 is a top plan view of FIGURE 1.
FIG. 3 is a detail sectional view showing the position of the slide relative to the core for internal measurement.
FIG. 4 is another detail sectional view on the order of FIGURE 3 showing the position of the slide relative to the core for outer measurement.

The length measuring appliance shown in FIGS. 1 and 2 is provided with a tube-shaped body 1 having opposite side windows and which at one end is screwed firmly to a measuring stop 2. In this body a slide 3 is mounted for longitudinal movement. In this case the inner surface 1a of the body 1 is provided with a groove which forms one track, while the outer surface 3a of the slide 3 has a groove to form the other track for balls 4 within a cage 5.

The slide 3 is fitted with two ring bearings 6 and 7 in which a core 8 can slide. A guide pin 9 screwed into this core 8, passes through longitudinal grooves of the slide, the ball cage and the body, and prevents the core, slide and ball cage from turning relatively to the body 1, but only in the longitudinal direction, whilst on the other hand, the relative movement between the core 8 and the slide 3 is limited.

Through a micrometer screw 12, mounted in the body 1, the screw engaging with a corresponding threaded first bore 8a of the core 8, the core can be adjusted relatively to the body. In the known manner the micrometer screw is provided with a drum 11 which, by means of the screw 10 is secured thereto and carries the peripheral divisions 11a. The micrometer screw is subjected to the longitudinal pressure of a strong spring 13, which, by a supporting disc 14 and a spring ring 15 bears against this and presses it against the bolt 16 fitted into the measuring stop 2. As a result any possible clearance between the body 1 and the micrometer screw 12 is eliminated. The spring 13 is selected of such strength that it does not yield to the measuring pressure acting on the slide 3. For the observation of the method of operation of the appliance it is possible to start from the fact that the core 8 is connected firmly to the body 1 by the micrometer screw and remains so during the measuring operation.

To the core 8 is secured, by means of the part 17 and the screws 18, an indicator 19 consisting of a rotary pointer, of which the key 19a bears against the edge 3b of the slide 3. The indicator 19 thus shows the relative position of the core 8 to the slide 3. The pointer position of the indicator can thus be read through openings in the body 1, the ball cage 5 and the slide 3. A transparent sleeve 20 protects the mechanism from dust and other external influences.

For servicing the measuring drum 11, as also for reading the drum divisions 11a, openings 1b are provided in the body 1. The position of the core 8 relatively to the body 1 can be read off on a graduation 1c provided on the latter by means of reference strokes 17a provided on the part 17.

The slide 3 is connected to the core 8 through an elastic coupling. Into the slide 3 is screwed a bolt having a collar 21 with a screw thread 21a and the screw head 21e. Thereby it is adjustable with limit in the slide. The possibility of adjusting this bolt in the slide 3 is limited, on the one hand, by a shoulder 21b, and, on the other hand, by a spring ring 22 fitted into the bolt. On to a cylindrical shank 21c of the bolt having a collar 21 are further fitted a sleeve 23, a pressure spring 24 and a ring disc 25, which parts are firmly held thereon by a screw 26 provided in the bolt 21. The disc 25 is slidably mounted in a second bore 8b of the core 8. The core is closed by a nut 27.

The measuring appliance is fitted with two work engaging arms 28, which themselves carry measuring bolts 29. By means of parts 30 and screws 31 on the impact surfaces 2a and 3c of the measuring stop 2, or of the slide 3 adjustably secured, the key arms 28 can be firmly clamped at any suitable level in height.

FIG. 1 shows the appliance in the position for internal measurement. The shaded part 32 in FIGS. 1 and 2 show parts of an average bore to be measured. By suitable turning of the drum 11, the appliance is so adjusted that the indicator 19, mounted therein, indicates the value "0" (FIG. 2). The measuring value obtained can then be read from the scales 11a and 1c.

The slide 3 is, on the one hand under the action of the measuring force, which in FIG. 1 presses it from right to left, in other words under the opposed force action of the spring 24. The slide position relatively to the core is thus indicator 19, as already mentioned.

When the device is used for internal measurement the slide 3 is adjusted according to FIG. 3. The bolt 21 is screwed in, in such a manner that the spring ring 22, fitted therein, bears against the surface 3c of the slide 3. Under the action of a measuring force P, the slide 3 can be forced against the action of the spring 24 into the body 1 to such an extent until the pin 9, located in the core 8 (FIG. 1) abuts against the right hand side 3d of the groove in the slide 3. The indicator or gauge 19 is preferably so adjusted that it indicates at the middle the zero position of the travel to be traversed by the slide 3.

In order to arrange the appliance for outer measurements it is only necessary to turn back the bolt 21 to such an extent that its shoulder 21b bears inside against the slide 3 (FIG. 4). When, in this case, a measuring force acts from left to right, as is the case when making outer measurements, the slide, against the action of the spring 24, can move out of the body 1, until the pin 9 fitted into the core 8 abuts against the left hand side 3e of the groove for the slide 3 (FIG. 1).

As shown in FIG. 1, the key arms 28 may be fitted with double-sided measuring bolts 29 so as thus to serve for internal and external measurements. It is naturally possible to provide the appliance with other key bolts of which the shape can be adapted to special measuring problems (measuring grooves, screw-threads, and so forth).

I claim:

1. A micrometer type measuring instrument for measuring internal and external surfaces, comprising, in combination, a tubular body (1) having opposite windows (1b) and opposite longitudinal slits, a tubular slide (3) mounted in said body for non-angular guided (4–5) axial movement relative to said slits and open at one end and closed at the other to provide an end wall, a work engaging arm (28) at the end of said slide, a core (8) co-axially mounted with said slide (3) and having a first threaded bore (8a) at one end and a second threaded bore (21a) at the other end and also having a longitudinal slot, a micrometer shaft having an unthreaded portion and a threaded portion (12) for entering said first threaded bore (8a), a drum (11) radially fixed on the unthreaded portion of said shaft (12) and slidable in said body at the location of said windows and having a peripheral scale cooperating with a zero mark on the related edge portions of the body, a wall in said body (1) in which the unthreaded portion of said shaft is journalled, a spring (13) confined between the unthreaded end of said shaft and said wall to frictionally maintain tight engagement between the threaded end of the shaft and the drum (11), a working engaging arm (28) on the end of the body adjacent said spring, adjustable means (21—27) between the end wall of the slide (3) and the core (8) for adapting the instrument to be set to measure inside or outside surfaces, an indicator (19) mounted on the longitudinal slot of the core, and a transparent sleeve (20) around the body at the zone of the longitudinal slots therein to expose said indicator.

2. A micrometer type measuring instrument for measuring internal and external surfaces, according to claim 1, wherein, the core has longitudinal ball receiving grooves and a tubular cage (5) surrounds the core with balls interlocked therewith and adapted to travel in said grooves to permit relative longitudinal sliding movement between the core and the body but prohibiting relative angular movement thereof.

3. A micrometer type measuring instrument for measuring internal and external surfaces, according to claim 1, wherein, the said adjustable means (21—27) includes a bolt having a collar (21) and adjacent threads (21a) for engaging related threads on the end wall (3c) of the slide (3), and the interior of the core (8) has a shoulder, and spring pressed sleeve (23—24) engaging the inside of the collar.

References Cited in the file of this patent

UNITED STATES PATENTS

| | | |
|---|---|---|
| 2,287,097 | Graham | June 23, 1942 |
| 2,648,134 | Billeter | Aug. 11, 1953 |